United States Patent [19]

Ide et al.

[11] Patent Number: 4,761,350

[45] Date of Patent: Aug. 2, 1988

[54] METHOD FOR PROCESSING DEFECTIVE FUEL CELLS IN FUEL CELL STACKS

[75] Inventors: Masahiro Ide, Hirakata; Nobuyoshi Nishizawa, Neyagawa; Nobuya Inoue, Habikino; Akio Inoue, Neyagawa; Osamu Takehara, Hirakata, all of Japan

[73] Assignee: Sanyo Electric Co., Ltd., Moriguchi, Japan

[21] Appl. No.: 38,118

[22] Filed: Apr. 14, 1987

[30] Foreign Application Priority Data

Apr. 18, 1986 [JP] Japan .................. 61-90561

[51] Int. Cl.$^4$ .................... H01M 6/50; H01M 6/00
[52] U.S. Cl. ........................... 429/49; 429/12; 429/48; 29/623.1
[58] Field of Search ............. 29/623.1; 429/12, 18, 429/48, 49

[56] References Cited

U.S. PATENT DOCUMENTS

| | | | |
|---|---|---|---|
| 4,252,869 | 2/1981 | Heitz et al. | 429/49 |
| 4,342,816 | 8/1982 | Kothmann et al. | 429/120 X |
| 4,397,918 | 8/1983 | Chi | 429/120 X |
| 4,407,909 | 10/1983 | Goebel | 429/48 X |
| 4,658,499 | 4/1987 | Rowlette | 29/623.1 |

FOREIGN PATENT DOCUMENTS 58-166677  10/1983  Japan ................... 429/18

Primary Examiner—Brian E. Hearn
Assistant Examiner—Stephen J. Kalafut
Attorney, Agent, or Firm—Armstrong, Nikaido, Marmelstein & Kubovcik

[57] ABSTRACT

One or more defective fuel cells in fuel cell stacks are shortcircuited by a process comprising the steps of making plural holes in bipolar plates adjacent to the defective cell from at least one end of their process gas channels, inserting corrosion-resisting conductive wire rods into resultant holes to shortcircuit between the bipolar plates, and then closing the process gas channels of the bipolar plates at both ends with a heat-resisting sealing material to stop the supply the process gases to the defective cells.

5 Claims, 3 Drawing Sheets

METHOD FOR PROCESSING DEFECTIVE FUEL CELLS IN FUEL CELL STACKS

BACKGROUND OF THE INVENTION

This invention relates to fuel cell power systems and, more particularly, to a method for processing defective cells in fuel cell stacks.

In general, a fuel cell power system comprises one or more fuel cell stacks each including of a number of individual fuel cells assembled into a stack together with bipolar plates placed between neigboring two cells. To maintain the fuel cell stack at its optimum operating temperature, cooling plates are arranged every several fuel cells in the stack.

In such fuel cell stacks, if one or more fuel cells become defective or inoperative, they lower the efficiency of the overall fuel cell stack and have adverse influence on the fuel cells adjacent to the defective cells by their abnormal heat generation, resulting in shortening the lifetime of the stack. In order to avoid such problems, it is the best way to replace the defective cell with new one every time one fuel cell becomes defective. However, the replacement of the individual defective cell is very troublesome and takes a long time since the fuel cells are electrically connected in series and physically assembled into a stack.

To solve such problems, it has been proposed in U.S. Pat. No. 4,397,918 (corresponding to Japanese patent application Laid-open No. 58-184772) to shortcircuit a particular set of fuel cells which contains one or more defective cells. In the prior art, the shorting is carried out, for example, as shown in FIG. 7, by inserting conductors 5 into respective cooling gas passages 4 to connect successive cooling plates 3 which sandwich a particular set of the fuel cells containing one or more defective cells. This method is readily carried out and downtime of the stack is greatly minimized.

However, in such a fuel cell stack, several cells, for example, five cells are sandwiched by successive cooling plates, so that, if only one fuel cell become inoperative or defective, the remaining four fuel cells are bypassed by the shortcircuit path. Thus, this process has a great influence of the performance of the overall fuel cell stack.

It is therefore an object of the present invention to provide a method for processing defective cells in fuel cell stacks which makes it possible to shortcircuit the defective cells only with ease and certainty, without having any influence on the fuel cells adjacent to the defective fuel cells.

SUMMARY OF THE INVENTION

According to the present invention, the above object is achieved by providing a method for processing defective fuel cells in fuel cell stacks of the kind comprising a number of fuel cells and bipolar plates each being placed between neigboring fuel cells, the method comprising the steps of making plural holes in a pair of bipolar plates adjacent to the defective cell from at least one end of their process gas channels, inserting corrosion-resisting conductive wire rods into resultant holes to shortcircuit said pair of bipolar plates, and then closing the process gas channels of said bipolar plates at the both ends with a heat-resisting sealing material to stop the supply the process gases to the defective cells.

The present invention will become more apparent from the following detailed description taken in conjunction with the accompanying drawings which show, by way of example only, preferred embodiments thereof.

DETAILED DESCRIPTION OF THE INVENTION

Figure 1:
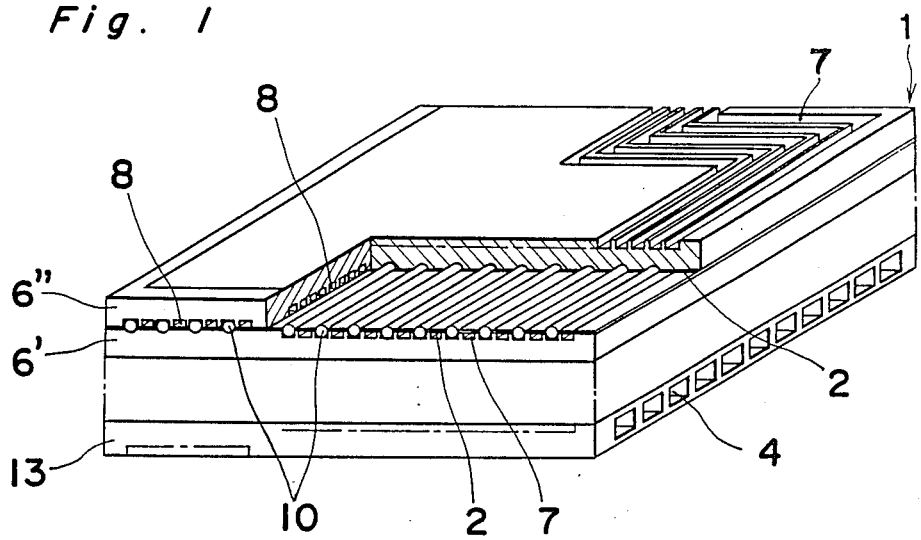
FIG. 1 is a partially cutaway view showing a part of a fuel cell stack embodying the present invention.
Figure 2:
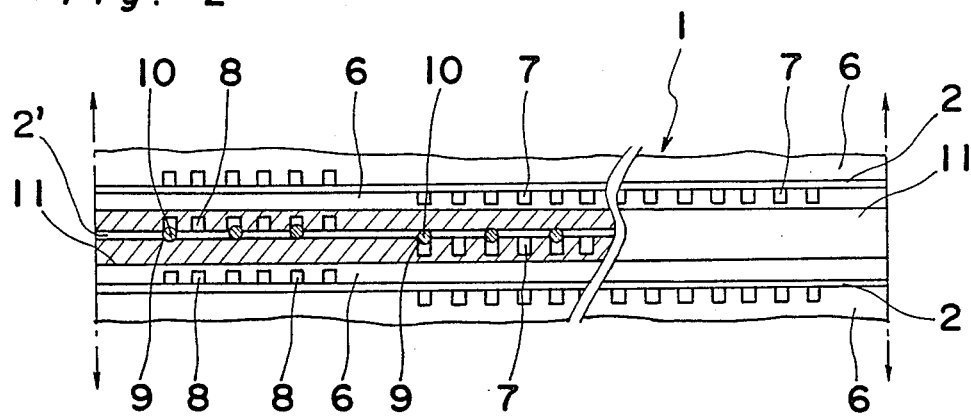
FIG. 2 is a partial front view of the fuel cell stack of FIG. 1.
Figure 3:
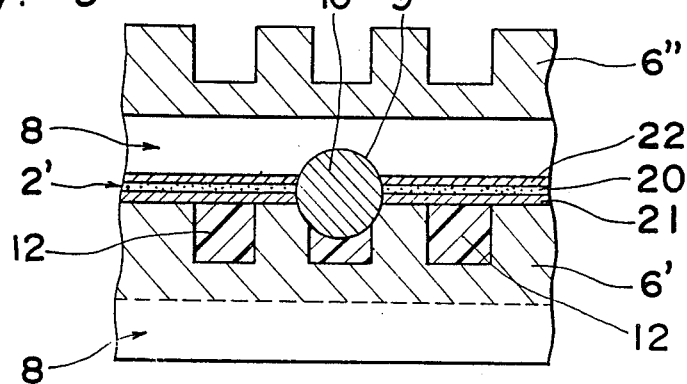
FIG. 3 is an enlarged partial section view of the fuel cell stack of FIG. 1.

Referring now to FIGS. 1 to 5, there is shown a fuel cell stack 1 embodying the present invention. The fuel cell stack 1 comprises a number of individual fuel cells 2, bipolar plates 6 placed between neigboring two fuel cells 2, and cooling plates 3 arranged every five cells 2. Each individual fuel cell 2 includes an electrolyte matrix 20 sandwiched between two electrodes 21 and 22 as shown in FIG. 3. Each individual bipolar plate 6 is made of a conductive material such as carbon and provided with process gas channels, i.e., process air channels 7 and fuel gas channels 8 in its opposite sides to form Z-shaped paths for the process gases as best seen in FIG. 1.

Although the fuel cell stack 1 further comprises end plates arranged at opposite ends of the stack, compression assemblies including compression bars and tie rods and being used to apply compression to the stack, and input and output manifolds for process gases and cooling gas arranged on opposite sides of the fuel stack, these members are omitted for simplification of the drawings since they are well known and disclosed in various literatures such as, for example, U.S. Pat. Nos. 4,397,918 and 4,342,816.

Figure 4:
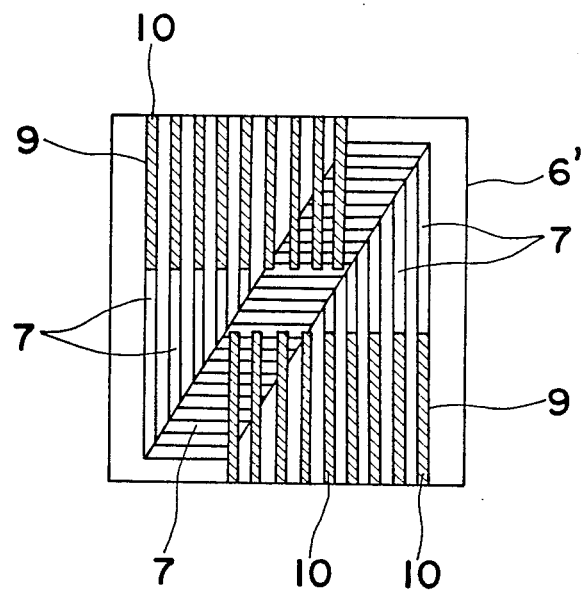
FIG. 4 is a bottom view of a bipolar plate adjacent to a defective cell.
Figure 5:
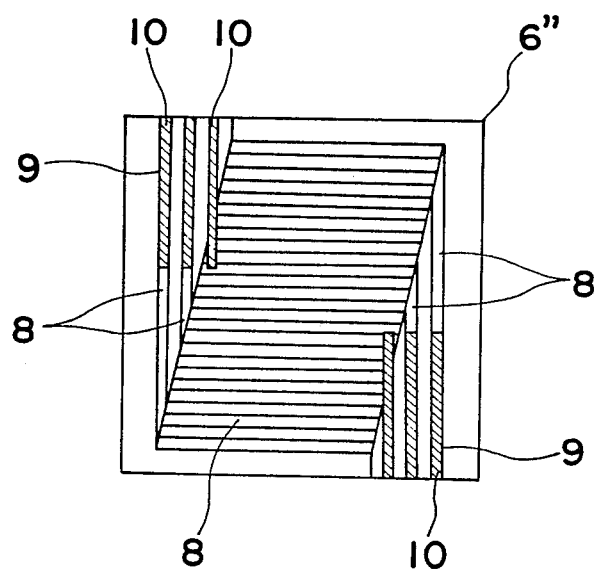
FIG. 5 is a top plan view of another bipolar plate adjacent to the defective cell.

During operation of the above fuel cell stack, if one or more fuel cell become defective, each defective cell is shortcircuited in the following manner in accordance with the present invention. After removing the process gas manifolds from the fuel cell stack, a pair of bipolar plates 6' and 6" which sandwich a defective fuel cell 2' are drilled together with the defective fuel cell 2' along the inlet and outlet portions of the process gas channels 7 and 8 using a drill horizontally. Thus, the resultant holes 9 extend from the both ends, i.e., inlet and outlet portions, of the process gas channels 7 and 8 of the bipolar plates 6' and 6" to the central area of the bipolar plates 6' and 6", as shown in FIGS. 4 and 5. The holes 9 have a diameter (generally 3 mm) greater than the width of the process gas channels 7 and 8 and are formed at certain spaces. The cutting powder accumulates in the process gas channels 7 and 8. In the drawings, the holes 9 are illustrated as being made at intervals of one process gas channel, but they are made at intervals of several process channels in practice.

After drilling operation, corrosion-resisting conductive wire rods 10 are pressed into the respective holes 9 to shortcircuit the bipolar plates 6' and 6" which sandwich the defective cell 2'. Preferably, the corrosionresisting conductive wire rods 10 are of stainless steel or carbon and generally have the same diameter with that of the holes.

In order to prevent process gases from mixing, the process gas channels 7 and 8 are closed at the both ends by filling a heat-resisting, sealing material 12 such as, for example, fluorine-contained rubber in all the open area of the channels and then applying a heat-resisting sealing material such as, for example, fluorine-contained binder to the ends of the defective cell 2' and a part of the bipolar plates 6' and 6" to form coatings 11.

Figure 6:
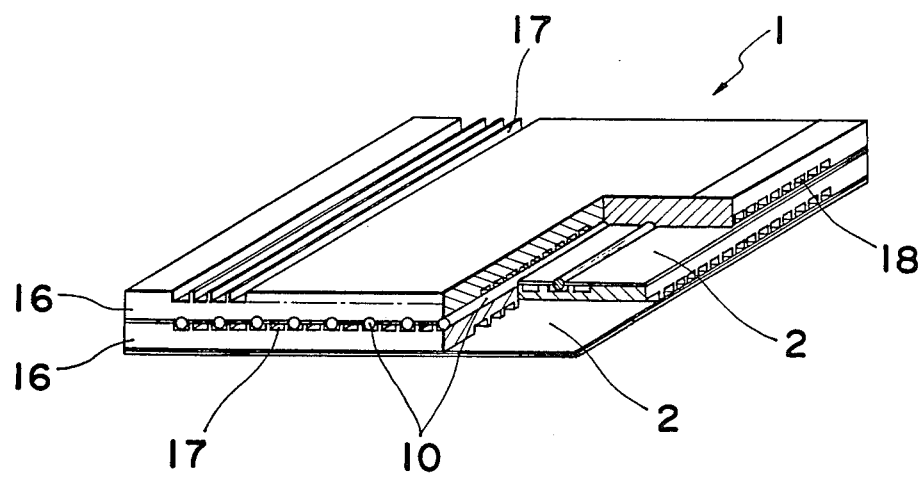
FIG. 6 is a partially cutaway, perspective view of a part of a fuel cell stack showing another embodiment of the present invention.
Figure 7:
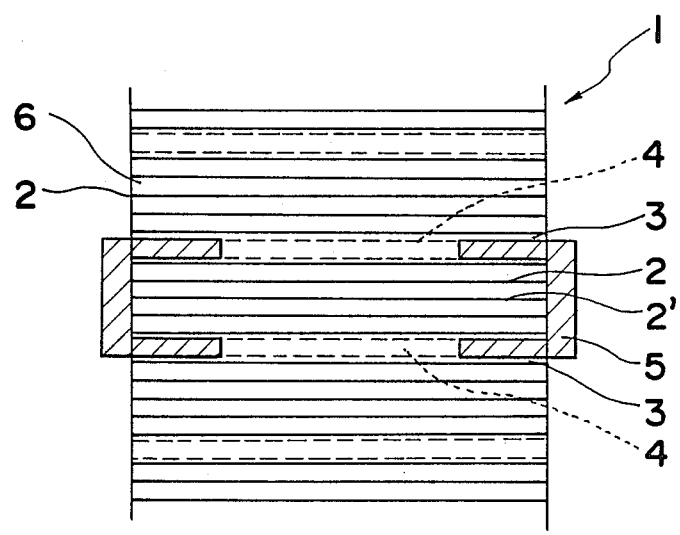
FIG. 7 is a partial section view of a fuel cell stack of the prior art.

In the foregoing embodiment, the present invention has been applied to the fuel cell stack of a separate cooling system in which the process gas channels 7 and 8 are formed in Z-shaped patterns, but it may be applied to a fuel cell stack which includes, as shown in FIG. 6, bipolar plates 16 provided, on its opposite sides, with straight process gas channels 17 and 18 extending in the directions perpendicular to each other. In this case, the inlets and outlets of the process gas channels 17 or 18 are distributed over the one end of the bipolar plate 16, so that holes 9 may be made along either process gas channels 17 or 18.

According to the present invention, the bipolar plates which sandwich the defective cell are directly connected by corrosion-resisting wire rods which are inserted into holes extending into and along the process gas channels, and all the inlets and outlets of the process gas channels for the defective cell are closed by the heat-resisting sealing material. Thus, the present invention makes it possible to shortcircuit each defective cells with ease and certainty, without having any influence on the fuel cells adjacent to the defective fuel cells.

What I claim is:

1. A method for processing defective fuel cells in fuel cell stacks of the kind comprising a number of fuel cells, bipolar plates each having process gas channels and being arranged between two neighboring fuel cells in the stack, and cooling plates arranged between every several fuel cells in the stack, the method comprising the steps of making plural holes in neighboring two bipolar plates adjacent to the defective cell, said holes extending between said bioplar plates further their both ends to their center area along the process gas channels of said bipolar plates, press-fitting corrosion-resisting conductive wire rods into said holes respectively to shortcircuit said neighboring two bipolar plates, and closing the process gas channels of said two bipolar plates with a heat-resisting sealing material at both ends of said process gas channels to stop the supply of the process gases to the defective fuel cell.

2. The method according to claim 1 wherein said holes are made along inlet and/or outlet portions of the process gas channels at intervals of several process gas channels.

3. A method according to claim 1 wherein said corrosion-resisting wire rods are made of stainless steel or carbon.

4. A fuel cell stack comprising
a number of fuel cells,
bipolar plates each having process gas channels and being arranged between neighboring two fuel cells in the stack,
cooling plates arranged every several fuel cells in the stack, and
a plurality of corrosion-resisting conductive wire rods each press fitted into one of a plurality of holes formed betwen neighboring two bipolar plates, between which a defective cell is sandwiched, to shortcircuit said neighboring two bipolar plates, said holes extending along the process gas channels of said two bipolar plates, said process gas channels geing sealed by a heat-resisting sealing material.

5. A fuel cell stack according to claim 4 wherein said corrosion-resisting wire rods are made of stainless steel carbon.

* * * * *